(12) United States Patent
Shin

(10) Patent No.: US 6,683,840 B2
(45) Date of Patent: Jan. 27, 2004

(54) VIBRATION DAMPER DEVICE FOR DISK DRIVE

(75) Inventor: Sang-Hoon Shin, Pyeongtaek (KR)

(73) Assignee: LG Electronics Inc., Seoul (KR)

( * ) Notice: Subject to any disclaimer, the term of this patent is extended or adjusted under 35 U.S.C. 154(b) by 124 days.

(21) Appl. No.: 09/925,513

(22) Filed: Aug. 10, 2001

(65) Prior Publication Data

US 2002/0021655 A1 Feb. 21, 2002

(30) Foreign Application Priority Data

Aug. 11, 2000 (KR) ........................................ 2000-46683

(51) Int. Cl.⁷ .............................................. G11B 33/08
(52) U.S. Cl. ...................................................... 369/247
(58) Field of Search ................................ 369/247, 263; 360/97.02; 248/632, 634–638

(56) References Cited

U.S. PATENT DOCUMENTS

| | | | |
|---|---|---|---|
| 4,922,478 A | | 5/1990 | Verhagen |
| 5,379,990 A | * | 1/1995 | Ando et al. .................... 267/34 |
| 5,737,304 A | * | 4/1998 | Soga et al. .................. 369/247 |
| 5,956,314 A | | 9/1999 | Ishimatsu et al. |
| 6,039,299 A | | 3/2000 | Ohnishi et al. |
| 6,249,504 B1 | | 6/2001 | Iwanaga |

* cited by examiner

*Primary Examiner*—George J. Letscher
(74) *Attorney, Agent, or Firm*—Birch, Stewart, Kolasch & Birch, LLP

(57) ABSTRACT

A vibration damper device for a disk drive which is equipped in a desktop computer or image reproducing apparatus and which includes a pick-up unit having a pick-up. A pick-up supporting unit has an upper supporting member and a lower supporting member positioned above and below the pick-up unit. The vibration damper has the pick-up unit fixed on its outer circumferential surface and a plurality of contact protrusions are formed on at least one surface among the upper surface and the lower surface attached to the pick-up unit supporting unit. A hole is formed in the vibration damper, and contact ribs are formed inside the hole to attenuate vibration generated in the disk drive efficiently, thereby minimizing vibrations transmitted to the outside.

13 Claims, 6 Drawing Sheets

A: 85~90Hz
B: 150Hz
24X: 4800~5000RPM

A: 85~90Hz
B: 65~ Hz

VIBRATION DAMPER DEVICE FOR DISK DRIVE

BACKGROUND OF THE INVENTION

1. Field of the Invention

The present invention relates to a disk drive which is intended for being equipped in a notebook computer, a desktop computer, CD-Player or DVD-Player and which reproduces CDs and DVDs, and particularly, to an antivibration device for such a disk drive which dampens vibration and noise among components of the disk drive.

2. Description of the Background Art

Recently, the speed of optical disk drives such as a CD-ROM DRIVE and DVD-ROM DRIVE is becoming much improved as 16×, 24× and further 48× speed, and due to this speed-up of the optical disk drive, there occurs a serious problem of vibration in case of driving a disk.

Particularly, in case of high-speed driving of a disk with an inclined center of gravity, the force of internal vibrations generated during a rotational cycle of a disk increases in proportion to the rotational speed of the disk, and in a disk drive mounted in a portable information processing apparatus and the like, this internal vibration is transmitted to a user's hands or the vibration generates noise thus causes user's displeasure or may decrease a reading capacity of information written on a disk. Also, in a DVD which is a high-density disk, the track pitch is half of that of a compact disk and accordingly, the reproducing capability of a disk is significantly decreased by such vibration.

To prevent vibration in such drives, a vibration damping member is installed between a base having a motor which generates such vibration and a main base for supporting the base.

FIG. 1A is a perspective view showing a vibration damper for a disk drive in accordance with the conventional art and FIG. 1B is a cross sectional view showing a main portion of a disk drive in which the vibration damper shown in FIG. 1A is used.

With reference to FIG. 1B, a tray unit 3 which moves for receiving a disk is installed in the disk drive, and a cover 1 is installed under the tray unit 3.

On the tray unit 3, a plurality of internally threaded bosses 3a are formed, and the cover 1 is fixed on the tray unit 3 by screws 5 which are threaded into the bosses 3a.

Between the cover 1 and the tray unit 3, a pick-up unit (not shown) is positioned for recording a signal on a recording surface or reproducing the recorded signal.

Particularly, the pick-up base 9 for supporting the pick-up unit (not shown) is supported between the cover 1 and the tray unit 3 by vibration dampers 7 (only one of which is shown) so as to attenuate vibration and impact transmitted from external portions of the drive. A spindle motor (not shown) for rotating a disk is installed in the pick-up base 9.

With reference to FIGS. 1A and 1B, each of the vibration dampers 7 is formed in a cylindrical form of rubber material, with a hole 7a therethrough inserted onto the bosses 3a of the tray unit 3.

Also, an insertion groove 7d is formed in the circumferential surface of the vibration damper 7 so that the pick-up base 9 can be inserted thereinto.

In the vibration dampers 7, the whole inner surface of the hole 7a is contacted with the outer surface of the bosses 3a and the upper and lower surfaces 7b and 7c respectively are contacted with the cover 1 and the tray unit 3.

Therefore, the vibration damper 7 decreases vibration and impact transmitted between the pick-up base 9 and the cover 1 and the tray unit 3 in case of operating the drive.

However, the conventional vibration damper 7 for a disk drive has a disadvantage in that vibration damping characteristic thereof is reduced due to heat generated in a portable information processing apparatus and transmitted to the disk drive, since the upper and lower surfaces 7b and 7c support the pick-up base 9 in the condition that the surfaces are respectively adhered to the cover 1 and the tray unit 3 and accordingly the vibration damping characteristic is weakened since the vibration damper 7 can become softened and become stuck to the surfaces 7b and 7c when the interior environment of the disk drive is under a high temperature due to generation of heat in the electronic circuit elements installed in the disk drive.

Namely, since the vibration dampers 7 are made of a rubber material and is repeately subjected to cycles of high-temperature and low-temperature, their vibration damping capacity is declines. Particularly, because the upper and lower surfaces 7b and 7c are respectively contacted with the cover 1 and the tray unit 3, accordingly, the amount of vibration amount transmitted to the cover 1 and the tray unit 3 through the vibration damper 7 relatively increases.

The vibration damping characteristics of the vibration damper 7 can be described with reference to FIG. 2 wherein the condition where vibrations generated when the disk drive is operating are transmitted to the outside is deemed as transmission rate 1 in a transmission curve. If the transmission rate is greater than 1, vibrations are amplified and transmitted to the outside and if the transmission rate is less than 1, vibrations are attenuated and transmitted to the outside.

The resonant frequency of the vibrations generated in the disk drive is 150 Hz and occurs at point B of the transmission curve in FIG. 2 exhibiting a maximum vibration transmission rate.

In case the disk drive is operated at 24× speed (24× the nominal "single" speed), the disk mounted in the drive rotates at 4,800~5,000 rpm and the frequency of vibration is 85~90 Hz. Point A in FIG. 2 represents the transmission rate in the case where the disk drive operates at 24× speed. The transmission rate according to the transmission curve is more than 1 and the vibration of the pick-up base 9 is amplified and transmitted to the outside due to a decrease in the vibration damping effect of the vibration damper 7.

To solve the problem, a washer or powder is used between the vibration damper 7, cover land the tray unit 3 to prevent the vibration damper from becoming softened and stuck under the conditions of high temperature and humidity. However, they increase the number of the components and complexity of the drive.

Particularly, since the conventional vibration damper 7 is installed in the condition that the upper and lower surfaces 7b and 7c are contacted with the cover 1 and tray unit 3 and the hole 7a is completely contacted with the bosses 3a to afford the vibration damping function, the resonant frequency is increased and accordingly, the damper can not attenuate vibrations sufficiently and thus transmits vibrations directly. Therefore, a user receives the vibration generated when operating the disk drive as it is.

A ball balance mechanism has conventionally also been applied to a turntable and the like in an attempt to solve the vibration problem. However, if a ball balance mechanism is used, the number of components increases thus increasing the cost.

SUMMARY OF THE INVENTION

Therefore, an object of the present invention is to provide an antivibration device for disk drive which can minimize vibration transmitted to the outside by attenuating vibration generated in the disk drive efficiently, to solve the above problem.

To achieve these and other advantages and in accordance with the purpose of the present invention, as embodied and broadly described herein, there is provided an antivibration device for a disk drive which has a pick-up unit in which a pick-up is mounted to reproduce information recorded in a disk or record information in the disk with a pick-up unit supporting unit wherein an upper supporting member and a lower supporting member are positioned above and below the pick-up unit and the upper supporting member and lower supporting member are fixed mutually in a separated position having a certain space therebetween by a fixing member, the antivibratiion device comprising a vibration damper for supporting the pick-up unit between the upper supporting member and the lower supporting member of the pick-up unit supporting means, where the vibration damping means has the pick-up unit fixed on an outer circumferential surface thereof and a plurality of contact protrusions are formed on at least one surface among the upper surface and the lower surface thereof contacted with the pick-up unit supporting means.

A hole is formed penetrating the upper and lower surface of the vibration damping means so that the vibration damping means may be inserted over the outer end of the fixing member, and inside the hole, a plurality of contact ribs are formed to be contacted with the fixing member.

In accordance with the invention there is provided an antivibration device for a disk drive which includes a pick-up unit in which a pick-up is mounted to reproduce information recorded in a disk or record information in the disk, and a pick-up unit supporting means wherein an upper supporting member and a lower supporting member are positioned above and below of the pick-up unit and the upper supporting member and lower supporting member are fixed mutually in a separated position with a certain space therebetween by a fixing member, the antivibration damping means comprising a vibration damping means for supporting the pick-up unit between the upper supporting member and the lower supporting member of the pick-up unit supporting means, wherein the vibration damping means has means for fixing the pick-up unit fixed on an outer circumferential surface thereof, a hole is formed penetrating upper and lower portions of the vibration damping means so that the vibration damping means can be inserted onto an outer end of the fixing member, and a plurality of contact ribs are formed inside the hole to be contacted with the fixing member.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A plurality of embodiments of the antivibration device for a disk drive can be envisioned and hereinafter, more preferred embodiments will be described.

Figure 1A:
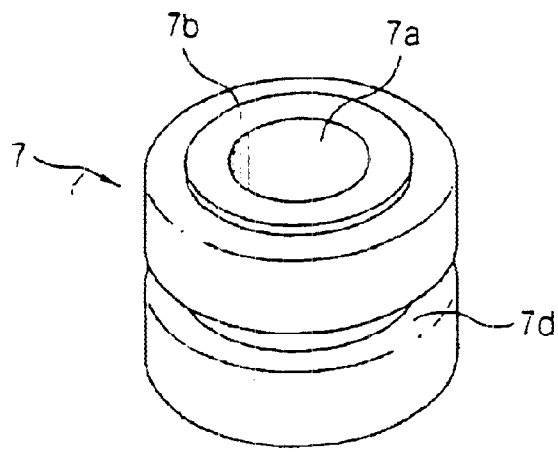
FIG. 1A is a perspective view showing a vibration damper for a disk drive in accordance with the conventional art.
Figure 1B:
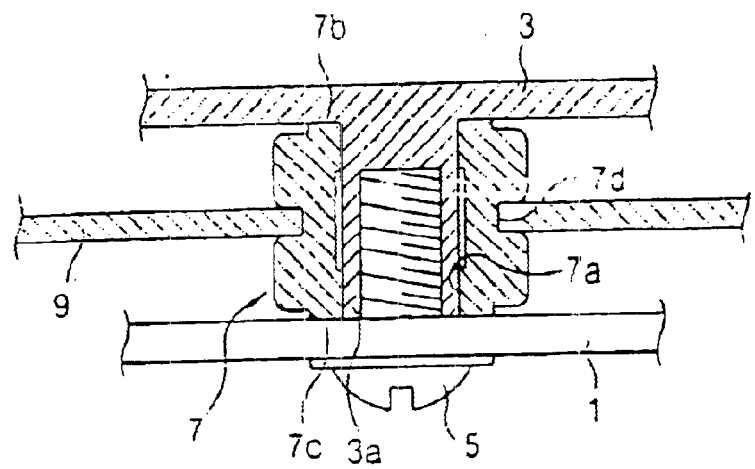
FIG. 1B is a cross-sectional view showing a main portion of the disk drive in which the vibration damper shown in FIG. 1A is used.
Figure 2:
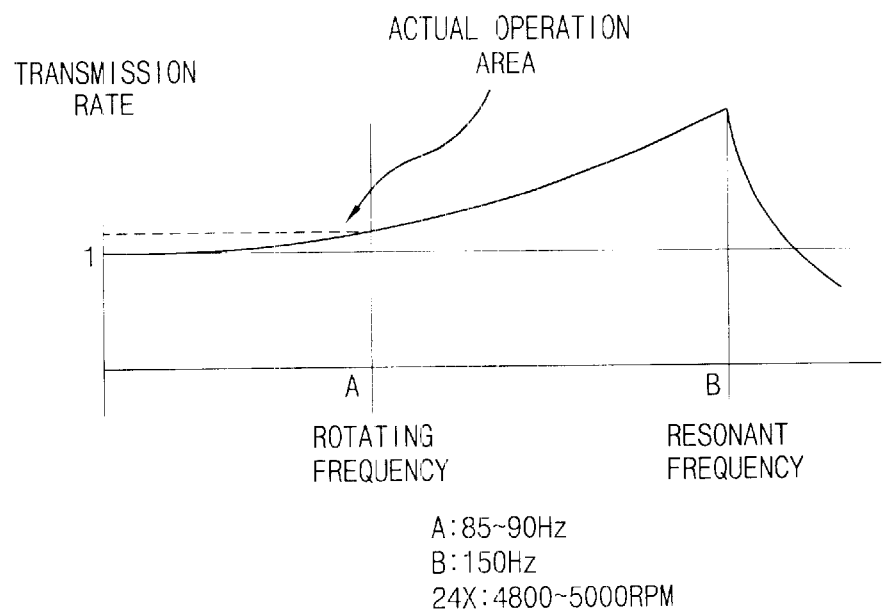
FIG. 2 is a graph showing a transmission characteristic of the vibration damper in accordance with the conventional art.
Figure 3:
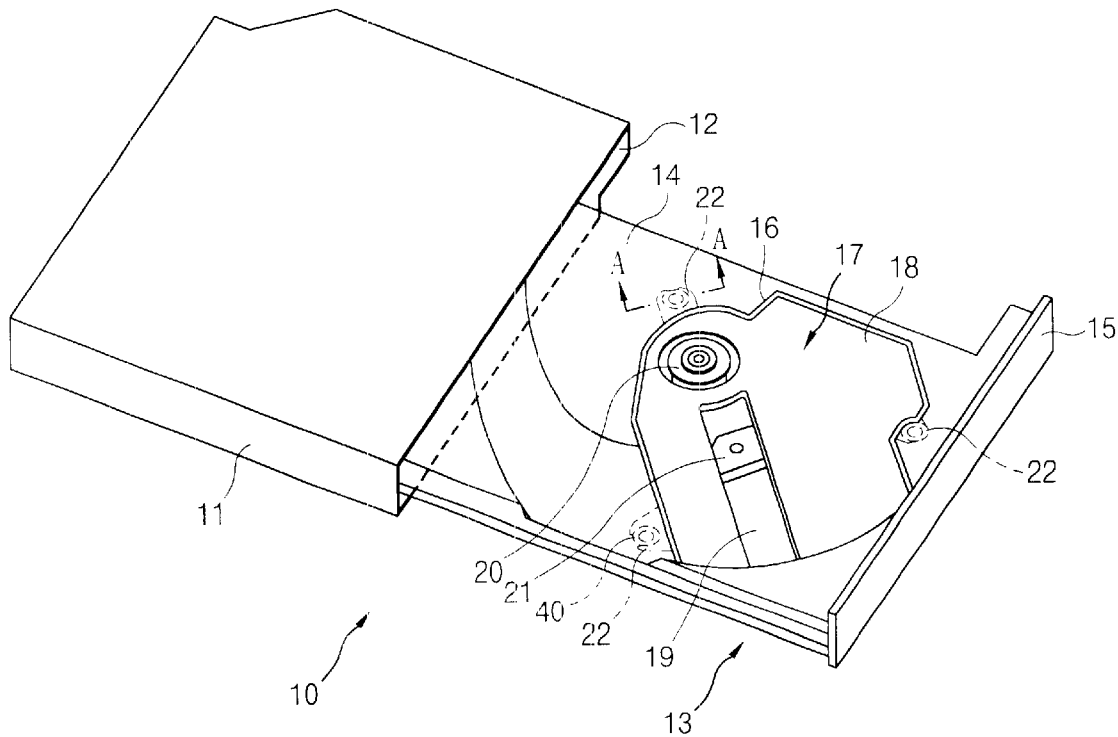
FIG. 3 is a perspective view of a disk drive in which the vibration damper in accordance with the present invention is applied.

FIG. 3 is a perspective view of a disk drive in which the vibration damper in accordance with the present invention is applied.

With reference to FIG. 3, the disk drive includes a housing 11 in a front surface of which a tray insertion opening 12 is formed and a connector (not shown) is provided enabling the drive to be connected to a printed circuit board inside of a notebook computer to send and receive signals with the notebook computer.

A tray unit 13 is installed to be movable between a position in which it is completely inserted inside of the housing 11 and a removal position as shown, in which it extends out of the housing 11 for enabling the mounting or removing of a disk.

At the front end of the tray unit 13 a panel 15 is installed, to close the tray insertion opening 12 so that the tray insertion opening 12 is not visible from the outside when the tray unit 13 moves to the position in which it is completely inserted inside of the housing 11.

In the tray unit 13, a disk receiving portion 14 is formed and at one end, a pick-up opening 16 is formed at which is installed a pick-up unit 17.

In the pick up unit 17, a disk receiving portion 18 which corresponds to the disk receiving portion 14 of the tray unit 13 is formed at the position where the pick-up opening 16 is formed in the tray unit 13 and a pick-up moving opening 19 too is formed in a radial direction of the disk so that a pick-up 21 can move therein relative to the disk.

Also, a spindle motor 20 is installed at a central portion of the disk receiving portions 14 and 18 in the pick-up unit 17. On the lower surface of the tray unit 13, a plurality of bosses 40, onto each of which a vibration absorbing member 32 is inserted, are protrudingly formed on the opposite surface from the disk receiving portion 14 near the pick-up opening 16.

At three positions around the edges of the pick-up unit 17, a corresponding number of vibration damper mounting portions 22 for each installing onto a respective vibration damper 32 is formed extending outwardly beneath the disk receiving portion 14.

Figure 4:
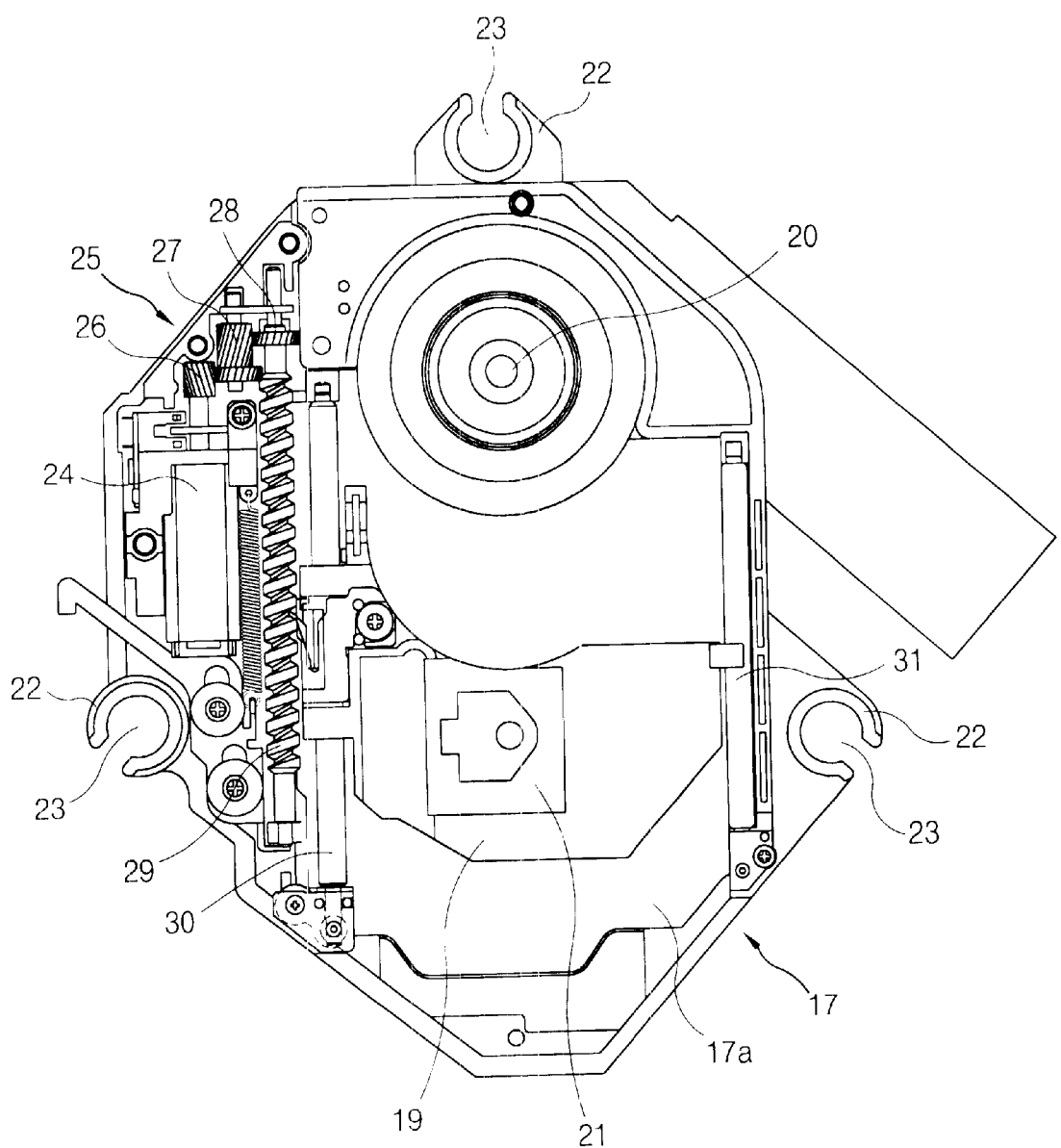
FIG. 4 is a rear elevation of a pick-up unit shown in FIG. 3.

FIG. 4 shows the underside of the disk receiving portion of the pick-up unit 17.

With reference to FIG. 4, at the right, left and upper edges of the pick-up unit 17, the vibration damper mounting portions 22 are formed extending outwardly from the pick-up unit 17 respectively and at each vibration damper mounting portion 22, a vibration damping member mounting opening 23 is formed.

Also, to move the pick-up 21 during the operation of the drive, a feeding motor 24 and a power transmission apparatus 25 are installed at one side for transmitting driving force of the feeding motor 24 to the pick-up 21.

The power transmission apparatus 25 comprises a plurality of gears 26, 27 and 28 and a lead screw 29 connected to the gears 26, 27 and 28. One end of the pick-up 21 is connected to the lead screw 29.

Guide shafts 30, 31 are installed at the right and left sides of the pick up moving opening 19 in the pick-up unit 17 and the left and right side portions of the pick-up 21 are connected to the guide shafts 30 and 31 respectively.

Therefore, when the feeding motor 24 rotates, the driving force of the feeding motor 24 is transmitted to the gears 26, 27 and 28 and the lead screw 29 rotates. At this time, the pick-up 21 is guided along the guide shafts 30 and 31 and moves horizontally in the pick-up moving opening 19.

Figure 5:
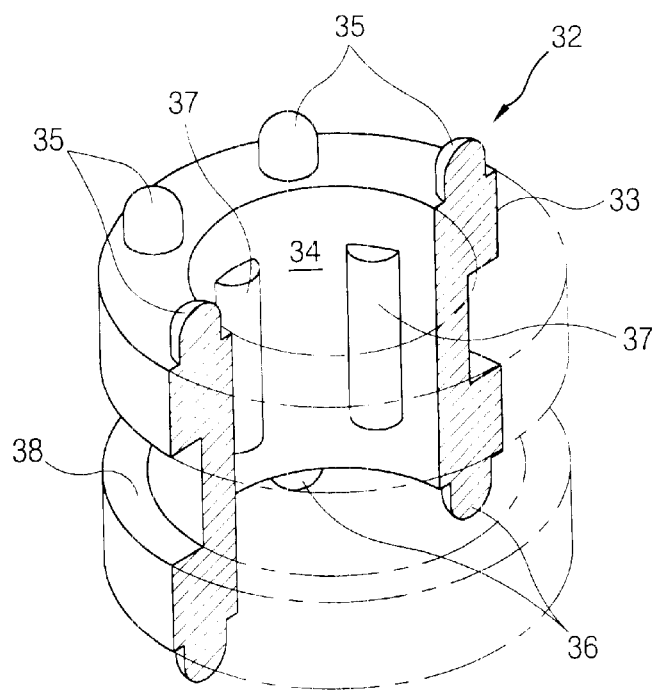
FIG. 5 is a partially cutaway perspective view showing the vibration damper in accordance with the present invention.

FIG. 5 is a partially cutaway perspective view showing the vibration damper in accordance with the present invention.

The vibration damper 32 in accordance with the present invention has a generally cylindrical body 33. In a central portion of the body 33, an axially extending boss hole 34 is formed. On the upper and lower surfaces of the body 33, a number of contact protrusions 35 and 36 are formed.

Figure 6:
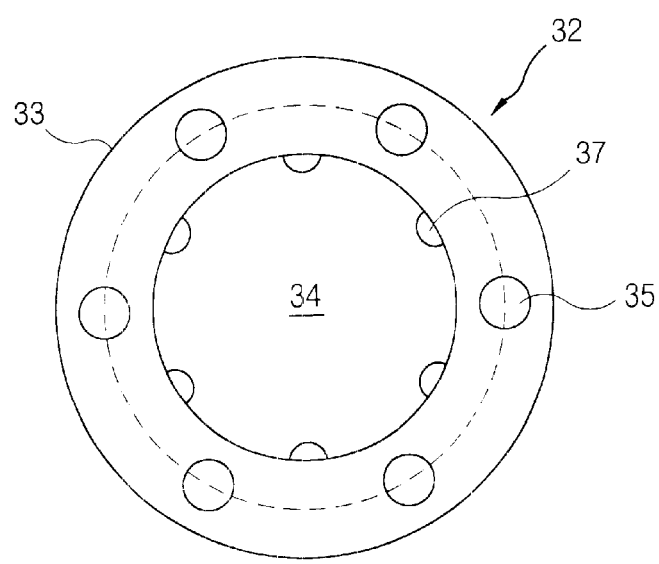
FIG. 6 is a plan view of the vibration damper shown in FIG. 5.

FIG. 6 is a plan view of the vibration damper. In the embodiment of the present invention, the contact protrusions 35 and 36 are respectively formed on the upper and lower surfaces of the body 33 at uniform intervals (six being shown by way of example).

The number of the contact protrusions 35 and 36 is determined in order to support the components which are contacted with the vibration damper 32 with a great balance. The number can be determined as more than 6, but since if there are too many contact protrusions, too much heat transmission from the components may result, it is desirable that a proper number of contact protrusions are formed in order to provide adequate contact while limiting heat transfer.

Also, the vibration damper 32 has a number of contact ribs 37 formed on the inner surface of the boss hole 34. The contact ribs 37 are formed axially extending from the upper end to the lower end of the boss hole 34 at uniform intervals and the length of the contact ribs is formed shorter than the length of the boss hole 34.

Therefore, the contact ribs 37 are spaced from the upper and lower ends of the boss hole 34.

The contact ribs 37 make pre-contact with the element which is inserted into the boss hole 34. In the illustrated embodiment of the present invention, the number of contact ribs 37 is 6 as shown in FIG. 6. It is desirable that the number of contact ribs is set with a proper number as that of contact protrusions.

An insertion groove 38 is formed in the circumference of the body 33 of the vibration damper 32. At the insertion groove 38, the vibration damper mounting portion 22 of the pick-up unit 17 is inserted and supported.

Figure 7:
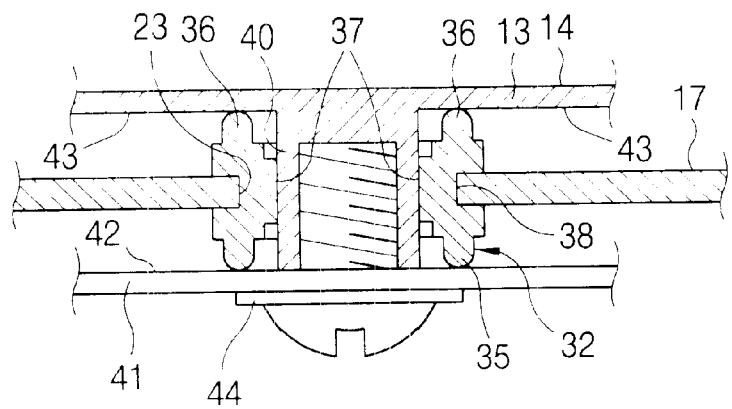
FIG. 7 is a cross-sectional view taken along section line A—A of FIG. 3 showing the state that the vibration damper in accordance with the present invention is installed in the disk drive in FIG. 3.

FIG. 7 is a cross-sectional view taken along section line A—A of FIG. 3 showing the state that the vibration damper in accordance with the present invention shown in FIGS. 5 and 6 is installed in the disk drive in FIG. 3.

With reference to FIG. 7, the boss hole 34 in the vibration damper 32 is inserted onto the boss 40 formed at the tray unit 13.

In addition, a screw 44 which penetrates the cover 41 is threaded into the boss 40.

Therefore, the vibration damper 32 is positioned between the cover 41 and the tray unit 13. At this time, the surface 42 of the cover 41 contacts with the contact protrusions 35 of the vibration damper 32 and the surface 43 of and the tray unit 13 is also contacted by the contact protrusions 36 of the vibration damper 32.

Also, the boss 40 inserted into the boss hole 34 contacts only with the contact ribs 37 inside the boss hole 34.

The insertion groove 38 formed in the circumference of the vibration damper 32 has inserted thereonto the vibration damper mounting opening 23 which is formed at the vibration damper mounting portion 22 of the pick-up unit, thus to support the pick-up unit 17.

The operation in case of the vibration damper being installed in the disk drive will be described next.

The vibration damper in accordance with the present invention is installed between the cover 41 and the tray unit 13 and supports the pick-up unit 17.

Such vibration damper can block transmission of vibration between the cover 41, tray unit 13 and pick-up unit 17.

Namely, since the vibration damper 32 is made of rubber material and has a certain elasticity, vibrations generated from the pick-up unit 17 are absorbed thereby and is blocked so as not to be transmitted to the cover 41 or tray unit 13.

At this time, contact between the vibration damper 32 and the cover 41 and between the vibration damper 32 and the tray unit 13 is by way of the contact protrusions 35 and 36 and thus the contact area is minimized. Therefore, heat generated during the operation of the disk drive is not well transmitted to the vibration damper 32. However, vibration can be attenuated sufficiently.

Also, the contact ribs are formed axially at uniform intervals inside the boss hole 34 provide supporting contact between the boss hole 34 and the boss 40.

On the other hand, the manner in which the contact ribs 37 are formed at the boss hole 34 enable to decrease the resonant frequency and minimize the contact area between the boss hole 34 and the boss 40 and the amount of material forming the vibration damper 32. Therefore, the resonant frequency can be lowered without decreasing the hardness of the vibration damper.

In addition, due to the shape of the central portion of the vibration damper 32 and the contact protrusions 35 and 36, transmission of vibrations to the outer portion can be minimized since the resonant frequency can be lowered while having same hardness as that of the conventional vibration damper.

Figure 8:
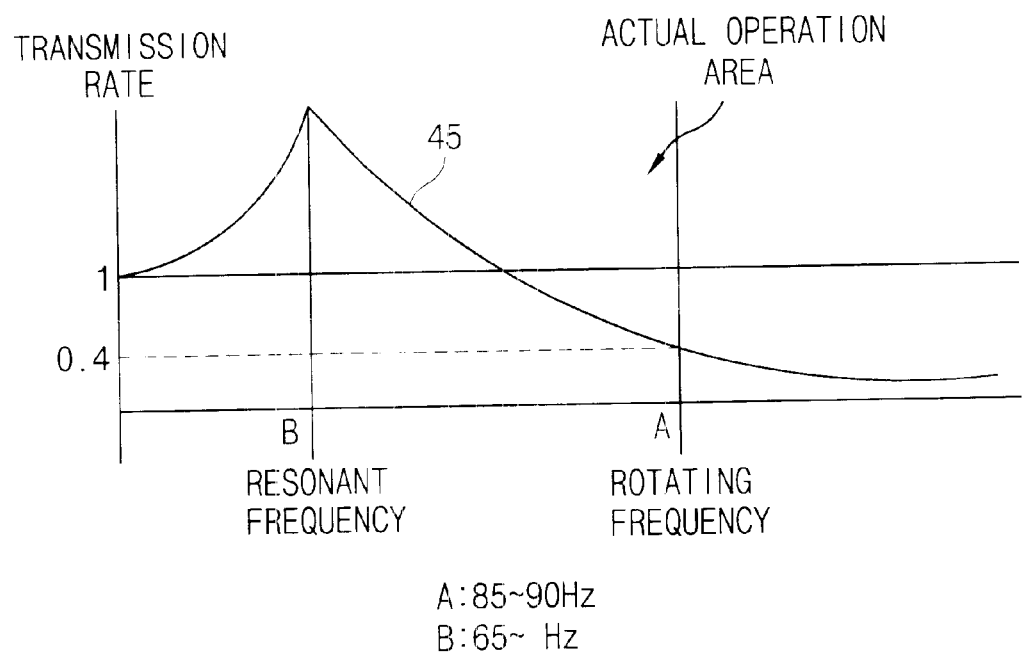
FIG. 8 is a graph illustrating a transmission characteristic of the vibration damper in accordance with the present invention.

FIG. 8 shows a vibration transmission characteristic curve 45 according to the change in frequency.

If the vibration damper 32 in accordance with the present invention is applied, the resonant frequency of the disk drive is remarkably lowered to the point B where the frequency is 65 Hz.

The transmission curve 45 is maximized at the resonant frequency, point B, and as the frequency increases, the transmission rate decrease remarkably.

The rotating frequency at 24× speed is 85~90 Hz. At point A, the vibration transmission rate becomes about 0.4 and accordingly, vibration of the drive is attenuated by more than half.

Figure 9:
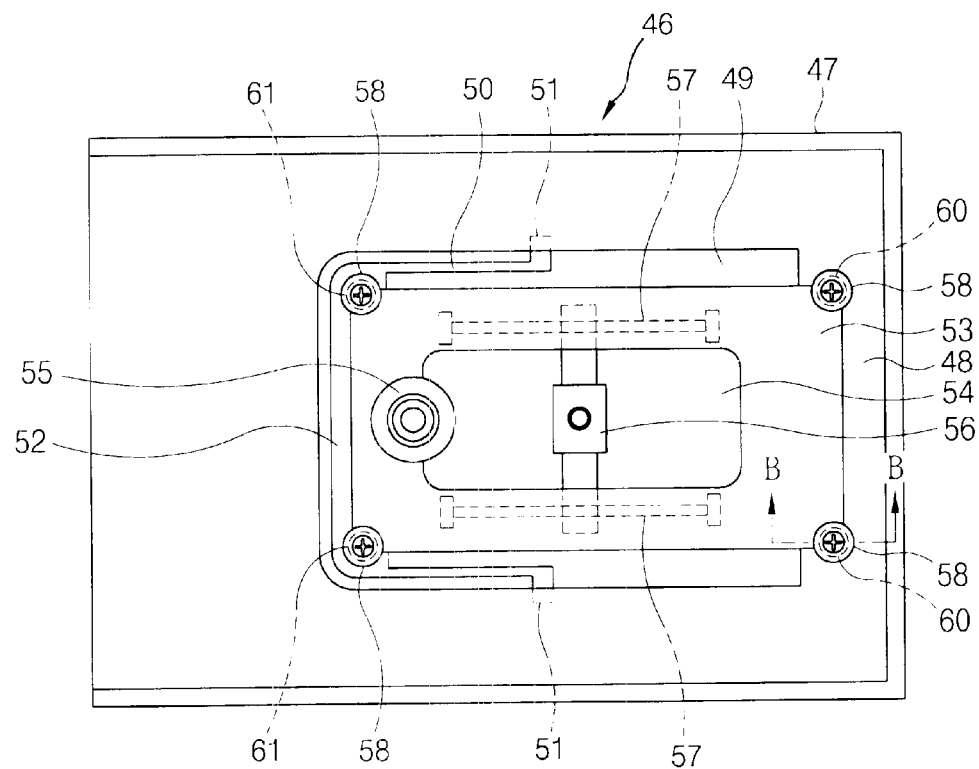
FIG. 9 is a plan view of a disk drive adopting the inventive vibration damper applied to a desktop computer or an image or an audio reproducer.

FIG. 9 is a plan view of a drive incorporating the inventive vibration damper applied to a desktop computer or an image or an audio and/or video reproduction device.

As shown in FIG. 9, the drive 46 includes a main base 47 having a mounting surface 48 in the right side portion of the a main base 47 and a pick-up opening 49 is formed at the central portion of the a main base 47.

An up-down movable base 50 is installed in the pick-up opening 49 and hinge portions 51 of the up-down movable base 50 are movably connected to the main base 47.

A pick-up unit mounting surface 52 is formed at a front end of the up-down base 50 and a left side portion of a pick-up unit 53 is mounted on the pick-up unit mounting surface 52. Also, a right side portion of the pick-up unit 53 are mounted on the mounting surface 48 of the main base 47.

Pairs of bosses 60 and 61 are protrudingly formed on the mounting surface 48 of the main base 47 and a vibration damper 32 is installed on each of the bosses 60 and 61

In a central portion of the pick-up unit 53, a pick-up moving opening 54 is formed and a pick-up 56 is guided on guide shafts 57 which are installed on the lower surface of the pick-up unit 53. A spindle motor 55 for rotating a disk received theron is installed at a front end of the pickup unit 53.

The vibration damper 32 according to the present invention is installed at the edge portion of the pick-up unit 53.

Figure 10:
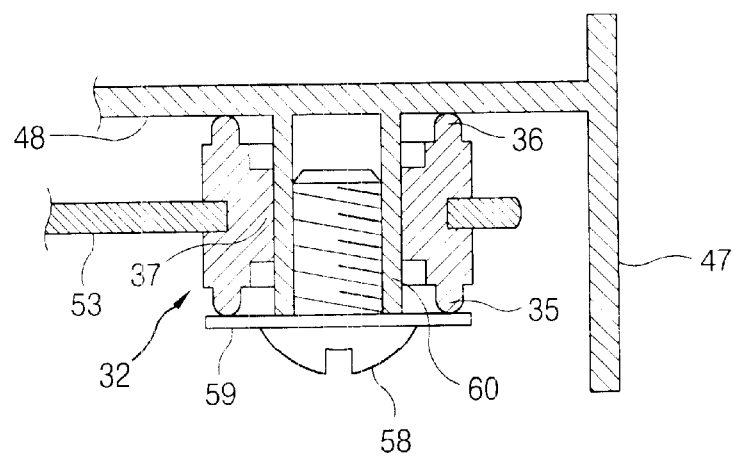
FIG. 10 is a cross-sectional view taken along section line B—B of FIG. 9 showing the state that the vibration damper in accordance with the present invention is installed in the disk drive in FIG. 9.

FIG. 10 is a cross-sectional view taken along the section line B—B in FIG. 9. In FIG. 10, the vibration damper according to the present invention is combined with the pick-up unit 53 and is supported between the supporting skirt portion 59 which is formed at the head portion of a screw 58 and the mounting surface 48 of the main base 47.

Namely, after the vibration damper 32 is inserted over the outer end of the boss 60 which is formed on the mounting surface 48 of the main base 47, the vibration damper 32 is supported so as not to be separated from the main base 47 by the supporting skirt portion 59 of the screw 58 which is threaded into the boss 60.

Therefore, the upper surface of the vibration damper 32 is contacted with the supporting skirt portion 59 of the screw 58 by the contact protrusions 35 and the lower surface of the vibration damper 32 is also contacted with the mounting surface 48 of the main base 47 by the contact protrusions 36.

Also, the contact ribs 37 which are formed around the boss hole in the vibration damper 32 are contacted with the boss 60.

The pick-up unit is inserted and supported in the insertion groove 38 of the vibration damper 32.

As shown in FIGS. 9 and 10, in the case that the vibration damper 32 in accordance with the present invention is applied to a desktop computer or an image or an audio reproducer, by virtue of the contact protrusions 35 and 36 and the contact ribs 37 which are formed in the vibration damper 32, the vibration damper in accordance with the present invention can attenuate vibrations and impacts generated from the pick-up unit 53 easily and maintain the attenuating characteristic.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A vibration damper device for a disk drive which has:
a pick-up unit in which a pick-up is mounted to reproduce information recorded in a disk or record information in the disk, and a pick-up unit supporting means wherein an upper supporting member and a lower supporting member are respectively positioned above and below the pick-up unit and the upper supporting member and lower supporting member are fixed mutually in a separated relation with a certain space therebetween through a fixing member, the vibration damper device comprising:
a vibration damping means for supporting the pick-up unit between the upper supporting member and the lower supporting member of the pick-up unit supporting means,
wherein the vibration damping means carries the pick-up unit fixed on an outer circumferential surface thereof and has a plurality of contact protrusions integrally formed on at least one surface among an upper surface and a lower surface thereof for contacting with the upper supporting member and lower supporting member, respectively, of the pick-up unit supporting means while limiting heat transfer, wherein the contact protrusions and a body of the vibration means are formed as a single piece.

2. The device of claim 1, wherein the contact protrusions are formed on both the upper and lower surfaces of the vibration damping means.

3. The device of claim 1, wherein the contact protrusions are formed having a uniform interval therebetween in the circumferential direction.

4. The device of claim 1, wherein a hole is formed penetrating between the upper and lower surfaces of the vibration damping means for enabling the vibration damping means to be inserted over an outer end of the fixing member, and wherein inside the hole, a plurality of contact ribs are formed to be contacted with the fixing member.

5. The device of claim 4, wherein the contact ribs are formed extended in the direction of the axis of the hole.

6. The device of claim 4, wherein the contact ribs are formed having uniform intervals therebetween in the circumferential direction on an inner surface of the hole.

7. The device of claim 4, wherein the contact ribs are formed to be juxtaposed between adjacent ones of the contact protrusions.

8. In a device having a pick-up unit on which an optical pick-up and a motor are mounted, with a plurality of vibration damping members resiliently supporting the pick-up unit on a base of said device, the improvement wherein at least one of said vibration damping members comprising:

a body made of rubber;

a circumferential insertion groove formed at a middle portion between upper and lower ends of the body for supporting the pick-up unit therein;

a hole formed through the body for enabling the body to be mounted to the base; and a plurality of contact protrusions formed on at least one of an upper and lower surface of the body for contacting the base while limiting heat transfer, wherein the contact protrusions and the body are formed as a single piece.

9. The device of claim 8, wherein a boss for inserting into the hole is formed on the base, and contact ribs for being contacted with the boss are formed in the hole the ribs extending in a direction of an axis of the hole.

10. The device of claim 8, wherein the contact ribs are formed at uniform intervals in the circumferential direction on an inner surface of the hole.

11. A vibration damper for a disk drive comprising:

a generally cylindrical body having means for fixing a pickup to an outer surface thereof; and a plurality of contact protrusions formed on at least one surface among an upper surface and a lower surface of the body for contacting the outer surface while limiting heat transfer, wherein the contact protrusion and the body are formed as a single piece to be respectively contacted with an upper supporting member and a lower supporting member positioned at an upper end and lower end respectively of the vibration damper.

12. The damper of claim 11, wherein the means for fixing the pickup comprise a circumferential insertion groove formed around the body.

13. The damper of claim 11, wherein the upper supporting member and the lower supporting member are fixed by a fixing member to each other mutually separated with a certain space therebetween; and wherein a hole is formed through the body for mounting the vibration damper onto the fixing member and a plurality of protrusions are formed in the hole for being contacted with the fixing member.

* * * * *